(12) United States Patent
Suzuki

(10) Patent No.: US 11,533,284 B2
(45) Date of Patent: Dec. 20, 2022

(54) MESSAGE PROCESSING DEVICE, SUGGESTION METHOD, AND RECORDING MEDIUM

(71) Applicant: Rakuten Group, Inc., Tokyo (JP)

(72) Inventor: Yuichi Suzuki, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 17/534,018

(22) Filed: Nov. 23, 2021

(65) Prior Publication Data

US 2022/0166739 A1    May 26, 2022

(30) Foreign Application Priority Data

Nov. 26, 2020   (JP) .............................. JP2020-196380

(51) Int. Cl.
*H04L 51/18*      (2022.01)
*G06F 16/958*    (2019.01)
*H04L 51/08*      (2022.01)

(52) U.S. Cl.
CPC ............ *H04L 51/18* (2013.01); *G06F 16/958* (2019.01); *H04L 51/08* (2013.01)

(58) Field of Classification Search
CPC ........ H04L 51/18; H04L 51/08; G06F 16/958
See application file for complete search history.

(56) References Cited

U.S. PATENT DOCUMENTS

2010/0281351 A1*  11/2010  Mohammed .......... G06F 40/103
                                                                    715/205
2013/0159433 A1*   6/2013  Chavan .............. G06Q 30/0241
                                                                    709/206
2014/0289608 A1*   9/2014  Asano ................... G06F 40/174
                                                                    715/234
2015/0134457 A1*   5/2015  Cheung .............. G06Q 30/0251
                                                                    705/14.64
2015/0199708 A1*   7/2015  Ying .................. G06Q 30/0241
                                                                    705/14.4
2020/0013074 A1*   1/2020  Yokota ............... G06Q 30/0202

FOREIGN PATENT DOCUMENTS

JP              6514834 B2     5/2019

* cited by examiner

*Primary Examiner* — Joe Chacko
(74) *Attorney, Agent, or Firm* — Sughrue Mion, PLLC

(57) ABSTRACT

In a message processing device processing a message to be sent from a sender to a user, an acceptor accepts a draft message generated by each of a plurality of senders. A registrant registers, in a database, a parts element satisfying a predetermined requirement from among elements included in the accepted draft message. A specifier specifies a non-parts element not satisfying the requirement from among elements included in the accepted draft message generated by a first sender. A display image generator generates a display image by applying a predetermined drawing engine to the specified non-parts element. A comparison image generator generates a comparison image by applying the drawing engine to an element acquired by expanding the registered parts element. A calculator calculates a degree of similarity between the generated display image and the generated comparison image. A suggester transmits, to the first sender, information prompting replacement of the non-parts element with the parts element related to the comparison image when the calculated degree of similarity exceeds a reference value.

7 Claims, 11 Drawing Sheets

FIG. 4

```
...
<div class="common">
        <div class="support">
                <a href="/support/s_top.html"> SUPPORT
                </a>
        </div>
        <div class="sale">
                <<R id="monthly_sale_small">>          PT </div>
</div>
...
```
MM1

| PARTS TAG | VARIABLE ELEMENT | REGISTRATION DATE | ... |
|---|---|---|---|
| <<R id="monthly_sale_small">> | <a href="/sale/ms202010.htm"><br><img src="/sale/ms202010small.png"><br></a> | 10/12 | ... |
| <<R id="monthly_sale_big">> | <a href="/sale/ms202010.htm"><br><img src="/sale/ms202010big.png"><br></a> | 10/12 | ... |
| <<R id="point_campaign">> | <a href="/entry/pc202010.htm"><br><img src="/entry/pc202010.png"><br></a> | 10/11 | ... |
| <<R id="bonus_chance">> | <a href="/entry/bc202010.htm"><br><img src="/entry/bc202010.png"><br></a> | 10/11 | ... |
| ... | ... | ... | ... |

```
...
<div class="common">
        <div class="support">
                <a href="/support/s_top.html"> SUPPORT
        </a>
        </div>
        <div class="sale">                                    ⸺NPT
                ┌─────────────────────────────────────┐
                │ <a href="/sale/ms202010.htm">       │
                │     <img src="/sale/ms202010small.png"> │
                │ </a>                                │
                └─────────────────────────────────────┘
        </div>
</div>
...
```

| Monthly Sale | October's Hot Deals are Here! |

| Monthly Sale | October's Hot Deals are Here! |

| Monthly Sale | Smart phones | Name-brand items | Toys | ... |
| Home Appliance | Clothing | Food | ... | October's Hot Deals are Here! |

┌─────────────────────────────────────────────── R13
│ Bonus   100 POINTS for      Sign up to
│ Chance  New Registration    get things
│                                 started

FIG. 8D

┌─────────────────────────────────────────────── R14
│ Bonus Chance                    Sign up here
│ 1000 POINTS for First Use of Service

FIG. 9

```
...
<div class="common">
        <div class="support">
                <a href="/support/s_top.html"> SUPPORT
                </a>
        </div>
        <div class="sale">
                <a href="/s
                        <im
                </a>
        </div>
</div>
...
```

Replacement with the following parts tag is suggested!!

<<R id="monthly_sale_small">>

Replace?

Yes    No

MESSAGE PROCESSING DEVICE, SUGGESTION METHOD, AND RECORDING MEDIUM

CROSS-REFERENCE TO RELATED APPLICATION

This application claims the benefit of Japanese Patent Application No. 2020-196380, filed on Nov. 26, 2020, the entire disclosure of which is incorporated by reference herein.

FIELD

This application relates generally to a message processing device, a suggestion method, and a recording medium.

BACKGROUND

In recent years, a sales site selling commodities and the like through the Internet delivers a mail magazine (including a newsletter and the like) for informing a new commodity, a commodity on special sale, and the like to users being customers. For example, the mail magazine is generated in a hypertext markup language (HTML) format and can inform users of commodities and the like with colorful images and detailed articles. In particular, at a large-scale sales site (such as a shopping mall site) where many stores (virtual stores) are concentrated, each store is a sender and delivers a mail magazine unique to the store to target users.

For example, as a related art for delivering such a mail magazine, a delivery device that can properly select a delivery destination according to a content of an article included in a newsletter is disclosed in Japanese Patent No. 6514834.

As described above, each sender (each store) generates a mail magazine at a large-scale sales site. As a result, a total quantity of mail magazines (total amount of delivery) handled by the entire system becomes enormous. Therefore, the sales site distributes a communication load and the like at the time of delivery by appropriately shifting delivery times of the mail magazines. For example, a different delivery date is scheduled for each sender of a mail magazine. Then, when a scheduled delivery date arrives, the sales site delivers a target mail magazine.

Due to such a present situation, a certain degree of time difference occurs between a time when a sender generates a mail magazine (a time when the magazine is registered in the system) and a time when the mail magazine is actually delivered to users. Under the effect of the time difference, a linked site or a referenced site on HTML having no problem at the time of registration of the mail magazine may disappear (in other words, change) at the time of delivery. For example, when informing a monthly sale, a sender describes a banner image of the monthly sale of the current month and a linked site thereof in a mail magazine by using an HTML standard tag. In this case, the banner image is normally displayed and the linked site thereof is valid at the time of registration of the mail magazine. However, when time elapses before delivery and, for example, when the mail magazine is delivered to a user the following month, the banner image is not displayed and the linked site is invalid when the user browses the mail magazine. In other words, so-called linkrot occurs.

In order to prevent such linkrot, a sales site prepares a unique tag called a "parts tag." A parts tag is a tag that can support a variable element in which a linked site or a referenced site changes over time. When the parts tag is described in HTML in a mail magazine, the parts tag is replaced with a latest linked site or a latest referenced site at the time of delivery. For example, when the aforementioned monthly sale is described by using standard tags, a banner image and a linked site thereof become variable elements. When the mail magazine is described by using parts tags for the monthly sale in place of the variable elements, the parts tags are expanded to tags for the latest banner image and the latest linked site at the time of delivery and the mail magazine is delivered with the parts tags replaced with the tags.

A sales site strongly recommends each sender to generate a mail magazine by using prepared parts tags for such variable elements (that is, elements in which linked sites and referenced sites change over time).

However, realistically, there are many senders who do not use such parts tags and write descriptions including variable elements when generating mail magazines.

Such an issue is not limited to a mail magazine and also similarly applies to a case of delivering various types of messages such as delivering information to users by using a short message service (SMS).

Therefore, a technology that can suggest use of a recommended parts element (such as a parts tag) to a sender of a message to be delivered to a user at the time of registration of the message or the like has been sought.

SUMMARY

The present disclosure has been made in view of the aforementioned actual situation, and an objective of the present disclosure is to provide a message processing device, a suggestion method, and a non-transitory recording medium that can properly suggest a use of a recommended parts element to a sender of a message.

A message processing device according to a first aspect of the present disclosure is a message processing device processing a message to be sent from a sender to a user and includes:

an acceptor accepting a draft message generated by each of a plurality of senders;

a registrant registering, in a database, a parts element satisfying a predetermined requirement from among one or more elements included in the draft message accepted by the acceptor;

a specifier specifying a non-parts element not satisfying the requirement from among one or more elements included in the draft message being generated by a first sender and being accepted by the acceptor;

a display image generator generating a display image by applying a predetermined drawing engine to the non-parts element specified by the specifier;

a comparison image generator generating a comparison image by applying the drawing engine to an element acquired by expanding the parts element registered in the database;

a calculator calculating a degree of similarity between the generated display image and the generated comparison image; and a suggester transmitting, to the first sender, information prompting replacement of the non-parts element with the parts element related to the comparison image when the degree of similarity calculated by the calculator exceeds a reference value.

Further, in the message processing device according to the aforementioned aspect, the specifier may specify the non-parts element being a variable element in which a linked site or a referenced site changes over time.

Further, in the message processing device according to the aforementioned aspect, the comparison image generator may generate the comparison image, based on the each parts element registered in the database in a most recent predetermined period.

Further, in the message processing device according to the aforementioned aspect, the registrant may register, in the database, the draft message accepted by the acceptor or the draft message in which the non-parts element is replaced with the parts element in accordance with a suggestion by the suggester.

Further, the message processing device according to the aforementioned aspect may further include a deliverer delivering, to the user, a message in which the parts element included in the draft message registered in the database is replaced with an element acquired by expanding the parts element when a delivery date and time associated with the draft message arrives.

A suggestion method according to a second aspect of the present disclosure is a suggestion method executed by a message processing device processing a message to be sent from a sender to a user and includes:

accepting a draft message generated by each of a plurality of senders;

registering, in a database, a parts element satisfying a predetermined requirement from among one or more elements included in the accepted draft message;

specifying a non-parts element not satisfying the requirement from among one or more elements included in the accepted draft message being generated by a first sender;

generating a display image by applying a predetermined drawing engine to the specified non-parts element;

generating a comparison image by applying the drawing engine to an element acquired by expanding the parts element registered in the database;

calculating a degree of similarity between the generated display image and the generated comparison image; and transmitting, to the first sender, information prompting replacement of the non-parts element with the parts element related to the comparison image when the calculated degree of similarity exceeds a reference value.

A non-transitory recording medium according to a third aspect of the present disclosure is a non-transitory computer-readable recording medium recording a program causing a computer processing a message to be sent from a sender to a user to function as:

an acceptor accepting a draft message generated by each of a plurality of senders;

a registrant registering, in a database, a parts element satisfying a predetermined requirement from among one or more elements included in the draft message accepted by the acceptor;

a specifier specifying a non-parts element not satisfying the requirement from among one or more elements included in the draft message being generated by a first sender and being accepted by the acceptor;

a display image generator generating a display image by applying a predetermined drawing engine to the non-parts element specified by the specifier;

a comparison image generator generating a comparison image by applying the drawing engine to an element acquired by expanding the parts element registered in the database;

a calculator calculating a degree of similarity between the generated display image and the generated comparison image; and a suggester transmitting, to the first sender, information prompting replacement of the non-parts element with the parts element related to the comparison image when the degree of similarity calculated by the calculator exceeds a reference value.

The aforementioned recording medium is a non-transitory recording medium and may be distributed and sold independently of a computer. A non-transitory recording medium herein refers to a tangible non-transitory recording medium. Examples of the non-transitory recording medium include a compact disk, a flexible disk, a hard disk, a magneto-optical disk, a digital video disk, a magnetic tape, and a semiconductor memory. Further, a transitory recording medium refers to a transmission medium (propagation signal) itself. Examples of the transitory recording medium include an electric signal, an optical signal, and an electromagnetic wave. Note that a temporary storage area refers to an area for temporarily storing data and a program and, for example, is a volatile memory such as a random access memory (RAM).

The present disclosure can properly suggest use of a recommended parts element to a sender of a message.

BRIEF DESCRIPTION OF THE DRAWINGS

A more complete understanding of this application can be obtained when the following detailed description is considered in conjunction with the following drawings, in which:

FIG. 2 is a block diagram illustrating an example of a configuration outline of a typical information processing device providing a message processing device, a sender terminal, and the like;

FIG. 4 is a schematic diagram illustrating an example of a parts tag described in a mail magazine;

FIG. 5 is a schematic diagram illustrating an example of parts tag information registered in a database;

FIG. 6 is a schematic diagram illustrating an example of a non-parts tag described in a mail magazine;

FIG. 7 is a schematic diagram illustrating an example of a display image generated based on a non-parts tag;

FIG. 8A is a schematic diagram illustrating an example of a comparison image generated based on an element acquired by expanding a parts tag;

FIG. 8B is a schematic diagram illustrating an example of a comparison image generated based on an element acquired by expanding a parts tag;

FIG. 8C is a schematic diagram illustrating an example of a comparison image generated based on an element acquired by expanding a parts tag;

FIG. 8D is a schematic diagram illustrating an example of a comparison image generated based on an element acquired by expanding a parts tag;

FIG. 9 is a schematic diagram illustrating an example of a suggestion screen for prompting replacement with a parts tag;

DETAILED DESCRIPTION

Embodiments of the present disclosure will be described below. While a delivery system delivering a mail magazine will be described as an example in the embodiments of the present invention, without being limited to such a mail magazine, the example embodiments are applicable to a case of delivering various types of messages such as a case of delivering information by using an SMS as will be described later.

In other words, the following embodiments are for explanatory purposes and do not restrict the scope of the present disclosure. Accordingly, while persons skilled in the art may adopt embodiments acquired by replacing each or all of the components of the embodiments with equivalents thereof, such embodiments are also included in the scope of the present disclosure.

Overall Configuration

Figure 1:
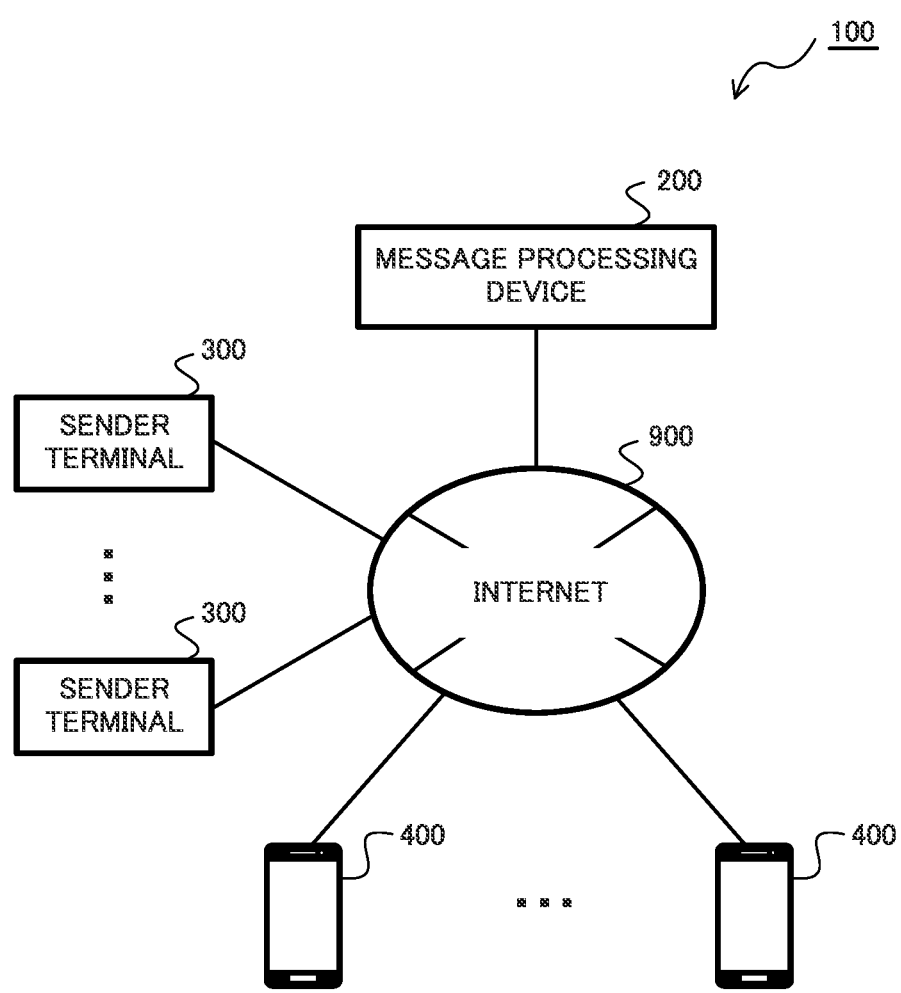
FIG. 1 is a block diagram illustrating an example of an overall configuration of a delivery system according to an embodiment of the present disclosure.

As illustrated in FIG. 1, a delivery system 100 according to an embodiment of the present disclosure has a configuration in which a message processing device 200 delivering mail magazines, sender terminals 300 used by senders (such as persons in charge of stores opened at a sales site) generating the mail magazines, and user terminals 400 used by users (such as users user-registered at the sales site) to whom the mail magazines are delivered are connected through the Internet 900. While being simplified in the diagram, many sender terminals 300 and user terminals 400 are assumed to exist according to the number of senders and users using the system.

The message processing device 200 is, for example, a server computer, accepts a mail magazine sent from a sender terminal 300, and delivers a mail magazine a delivery date and time of which has arrived to a user terminal 400 (more specifically, a mail address of a user being a delivery target). Since the message processing device 200 handles an enormous number of mail magazines, delivery times are appropriately shifted in such a way that a communication load and the like at the time of delivery are distributed. For example, the message processing device 200 schedules a different delivery date (delivery date and times) for each sender of a mail magazine. Then, when a scheduled delivery date arrives, the message processing device 200 delivers a target mail magazine.

Due to such a present situation, a certain degree of time difference occurs between a time when a mail magazine being a draft (draft message) is accepted from a sender terminal 300 and a time when the mail magazine is actually delivered to a user terminal 400.

Therefore, when a description of the accepted mail magazine includes an element (a non-parts tag to be described later) to be replaced by a parts tag, the message processing device 200 transmits information prompting replacement with the parts tag to a sender (sender terminal 300) generating the mail magazine.

The sender terminal 300 is, for example, a personal computer and generates an HTML formatted mail magazine (draft message) in accordance with an operation by a sender. Then, the sender terminal 300 transmits the generated mail magazine to the message processing device 200 in order to request delivery to a user terminal 400.

Note that use of a parts tag is recommended to the sender when the mail magazine is generated. The parts tag is a unique tag previously prepared in the delivery system 100 and is a tag that can support a variable element in which a linked site or a referenced site changes over time. In other words, since a certain amount of time elapses between generation (registration) and delivery of a mail magazine, description of HTML of the mail magazine with a parts tag in place of a standard tag being a variable element is required. When delivering a mail magazine including a parts tag, the message processing device 200 expands the parts tag to a latest linked site or a referenced site and replaces the parts tag with the site or the link before delivery to a user terminal 400.

The user terminal 400 is, for example a smartphone or a tablet terminal and receives a mail magazine delivered from the message processing device 200. Then, the user terminal 400 displays a content of the mail magazine on a screen in accordance with a browsing instruction by a user.

Configuration Outline of Information Processing Device

A typical information processing device 500 providing the message processing device 200, the sender terminal 300, and the like according to the embodiment of the present disclosure will be described.

Figure 2:
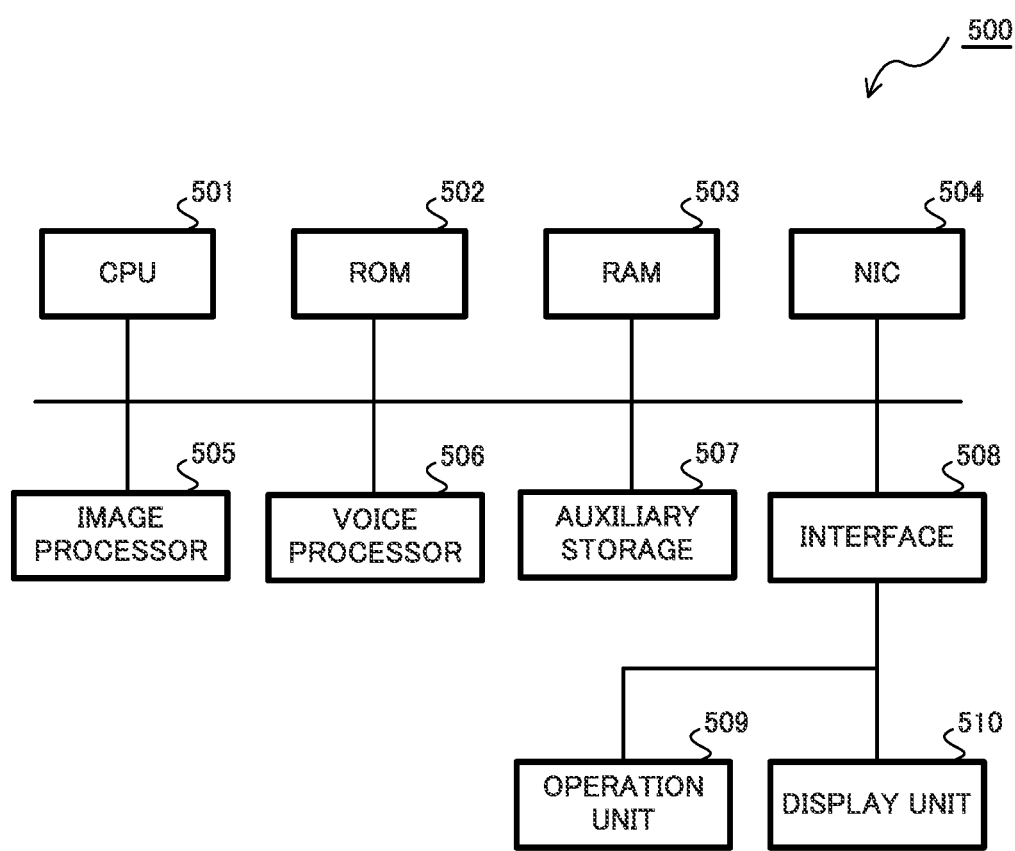

As illustrated in FIG. 2, the information processing device 500 includes a central processing unit (CPU) 501, a read only memory (ROM) 502, a random access memory (RAM) 503, a network interface card (NIC) 504, an image processor 505, a voice processor 506, an auxiliary storage 507, an interface 508, an operation unit 509, and a display unit 510.

The CPU 501 controls entire operation of the information processing device 500, is connected to each component, and exchanges a control signal and data with each component.

An initial program loader (IPL) executed immediately after power is turned on is recorded in the ROM 502; and by the IPL being executed, a program stored in the auxiliary storage 507 is read into the RAM 503, and execution of the program by the CPU 501 is started.

The RAM 503 is for temporarily storing data and a program and holds a program and data read from the auxiliary storage 507, and, in addition, data required for communication, and the like.

The NIC 504 is for connecting the information processing device 500 to a computer communication network such as the Internet and is configured with an NIC conforming to a 10BASE-T/100BASE-T standard used when configuring a local area network (LAN), an analog modem, an integrated services digital network (ISDN) modem, or an asymmetric digital subscriber line (ADSL) modem for connecting to the Internet by using a telephone line, a cable modem for connecting to the Internet by using a cable television line, or the like.

After processing image data read from the auxiliary storage 507 or the like by an arithmetic image processor (unillustrated) included in the CPU 501 or the image processor 505, the image processor 505 records the processed data into a frame memory (unillustrated) included in the image processor 505. The image information recorded in the frame memory is converted into a video signal at a predetermined synchronization timing and is output to the display unit 510 through the interface 508. When the information processing device 500 does not include the display unit 510, the image processor 505 outputs the converted video signal to an external display device. In other words, under control of the CPU 501, the image processor 505 generates an image required during progress of processing performed by the information processing device 500 and causes the display unit 510 or an external display device to display the image.

The voice processor 506 converts music data or voice data read from the auxiliary storage 507 or the like into a voice signal and externally outputs the converted signal through the interface 508 or the like. When the information processing device 500 includes a speaker, the voice processor 506 outputs the converted voice signal to the speaker. In other words, under control of the CPU 501, the voice processor 506 generates a music sound or a voice to be generated during progress of processing performed by the information processing device 500 and outputs the music sound or the like from an internal or external speaker.

The auxiliary storage 507 is a hard disk, a solid state drive (SSD), or the like and stores various types of programs and various types of data required for operation and control of the entire information processing device 500. For example, the auxiliary storage 507 stores a program for providing the message processing device 200 according to the embodiment or the like. Then, in accordance with control by the CPU 501, the auxiliary storage 507 appropriately reads a stored program and stored data and causes the RAM 503 or the like to temporarily store the program and data.

The interface 508 conforms to, for example, a standard such as HDMI (registered trademark) or a universal serial bus (USB) and is connected to the operation unit 509 and the display unit 510. In addition, the interface 508 transmits and receives required information to and from connected external equipment.

The operation unit 509 accepts an operation input by an operator or the like using the information processing device 500.

The display unit 510 draws an image according to a video signal or the like output from the image processor 505 and presents the image to an operator or the like using the information processing device 500.

In addition, the information processing device 500 may include a drive unit for a digital versatile disc (DVD)-ROM or the like in place of the auxiliary storage 507. In this case, the information processing device 500 reads a program and data from a DVD-ROM or the like mounted on the drive unit and operates similarly to the above.

A functional configuration and the like of the message processing device 200 provided by the aforementioned information processing device 500 will be described below with reference to FIG. 3 to FIG. 9. When power to the information processing device 500 is turned on and, for example, communication with a sender terminal 300 is enabled, a program for functioning as the message processing device 200 according to the present embodiment is executed, and the message processing device 200 according to the present embodiment is provided.

The user terminal 300 to be described later is also similarly provided by the information processing device 500.

Functional Configuration of Message Processing Device 200

Figure 3:
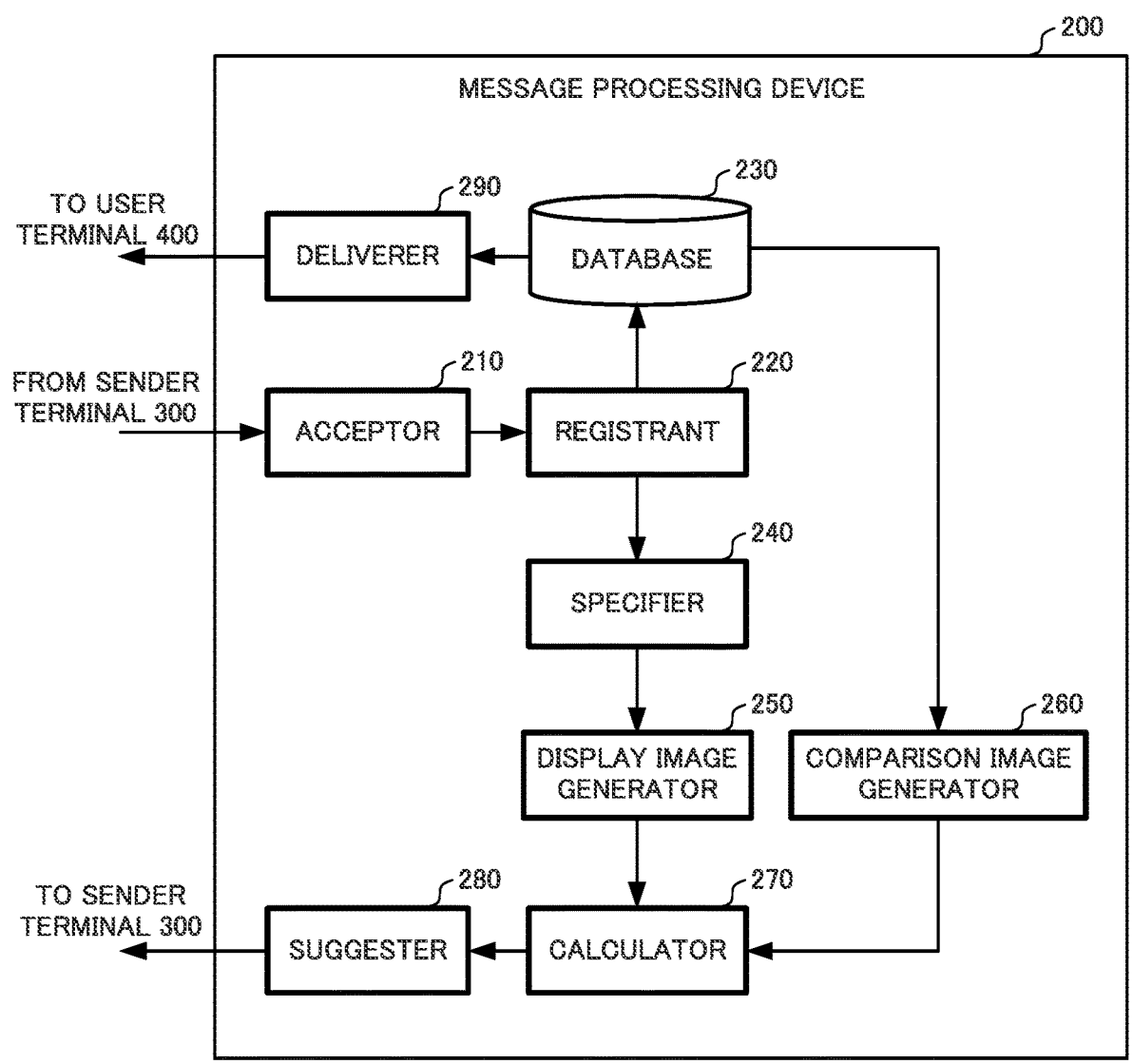
FIG. 3 is a block diagram illustrating an example of a functional configuration of a message processing device according to the present embodiment.

FIG. 3 is a block diagram illustrating an example of a functional configuration of the message processing device 200 according to the present embodiment. As illustrated, the message processing device 200 includes an acceptor 210, a registrant 220, a database 230, a specifier 240, a display image generator 250, a comparison image generator 260, a calculator 270, a suggester 280, and a deliverer 290.

The acceptor 210 accepts a mail magazine sent from a sender terminal 300 through the Internet 900. In other words, the acceptor 210 accepts a mail magazine being a draft (draft message) generated by each of a plurality of senders.

Further, when a suggestion by the suggester 280 to be described later is made to a sender terminal 300, the acceptor 210 accepts necessity (approval or rejection) for the suggestion as well.

The aforementioned NIC 504 may function as such an acceptor 210.

The registrant 220 registers, in the database 230, a parts tag included in a mail magazine accepted by the aforementioned acceptor 210. Specifically, from among elements included in a mail magazine described in an HTML format, the registrant 220 registers, in the database 230, a parts tag (parts element) satisfying a predetermined requirement.

For example, the registrant 220 registers, in the database 230, a parts tag PT included in a mail magazine MM1 as illustrated in FIG. 4 generated by a sender practicing use of parts tags, after checking whether the parts tag can be expanded to a standard tag, or the like.

Further, the registrant 220 registers, in the database 230, a mail magazine accepted by the acceptor 210 or a mail magazine in which a non-parts tag is replaced with a parts tag in accordance with a suggestion by the suggester 280. At that time, for example, the registrant 220 may register, in the database 230, a user terminal 400 being a delivery destination and a date and time at which delivery takes place (a delivery date and time) in association with the mail magazine.

The aforementioned CPU 501 may function as such a registrant 220.

Returning to FIG. 3, the database 230 stores and manages a parts tag registered by the aforementioned registrant 220.

For example, the database 230 manages a registered parts tag as parts tag information 231 as illustrated in FIG. 5.

The parts tag information 231 includes a parts tag 231a, a variable element 231b, and a registration date 231c.

A parts tag 231a is a registered parts tag. A variable element 231b is an element of a linked site or a referenced site when a parts tag 231a is expanded. A variable element 231b is an element at the time point of registration of a parts tag 231a, and, as will be described later, when the deliverer 290 delivers a mail magazine including the parts tag, the latest linked site or referenced site at the time of the delivery is acquired by expanding the parts tag.

Further, the database 230 also stores and manages a mail magazine registered by the registrant 220.

The aforementioned auxiliary storage 507 may function as such a database 230.

The specifier 240 specifies a non-parts tag that does not satisfy a requirement (that should be described by a parts tag) from among elements included in a mail magazine accepted by the acceptor 210. In other words, the specifier 240 specifies a non-parts tag (non-parts element) being a variable element included in a mail magazine described in an HTML format.

For example, the specifier 240 specifies a non-parts tag NPT included in a mail magazine MM2 as illustrated in FIG. 6 generated by a sender not practicing use of parts tags (a first sender).

The aforementioned CPU 501 may function as such a specifier 240.

Returning to FIG. 3, the display image generator 250 generates a display image by applying a predetermined drawing engine (such as a browser drawing engine) to a non-parts tag specified by the aforementioned specifier 240.

For example, the display image generator 250 generates a display image DI as illustrated in FIG. 7, based on a description of the non-parts tag NPT illustrated in aforementioned FIG. 6.

The aforementioned image processor 505 may function as such a display image generator 250.

The comparison image generator 260 generates a comparison image by applying a drawing engine to an element acquired by expanding a parts tag registered in the aforementioned database 230. At that time, the comparison image generator 260 generates a comparison image based on each parts tag registered in the database 230 in the most recent predetermined period.

For example, referring to the parts tag information 231 illustrated in aforementioned FIG. 5, the comparison image generator 260 generates comparison images RI1 to RI4 as illustrated in FIG. 8A to FIG. 8D, based on descriptions of variable elements 231b related to recently registered parts tags 231a.

The aforementioned image processor 505 may function as such a comparison image generator 260.

The calculator 270 calculates a degree of similarity between a display image generated by the display image generator 250 and a comparison image generated by the comparison image generator 260.

For example, the calculator 270 calculates a degree of similarity between the display image DI illustrated in FIG. 7 and each of the comparison images RI1 to RI4 illustrated in FIG. 8A to FIG. 8D by using a learner undergoing machine learning. Without being limited to such a technique using a learner, the technique for calculating a degree of similarity may calculate a degree of similarity by using another technique such as extracting a feature point from each image and performing pattern matching.

In this case, the calculator 270 calculates a degree of similarity between the display image DI illustrated in FIG. 7 and the comparison image RI1 illustrated in FIG. 8A at a sufficiently high value (a value exceeding a reference value).

The aforementioned CPU 501 or the like may function as such a calculator 270.

When a degree of similarity calculated by the aforementioned calculator 270 exceeds the reference value, the suggester 280 suggests replacement of a non-parts tag with a parts tag to a sender terminal 300. Specifically, when a variable element (non-parts tag) to be replaced with a parts tag exists in a mail magazine and a degree of similarity between a display image and a comparison image is sufficiently high, the suggester 280 transmits information prompting replacement of the non-parts tag with a parts tag being the source of the comparison image to a sender of the mail magazine.

For example, the suggester 280 transmits a suggestion screen SG as illustrated in FIG. 9 to a sender terminal 300, causes the screen to be presented in such a way as to be superimposed on a variable element (non-parts tag) in the mail magazine MM2, and suggests replacement of the non-parts tag with a recommended parts tag.

When the suggestion is approved by the sender, the aforementioned registrant 220 registers, in the database 230, a mail magazine in which the non-parts tag is replaced with the parts tag. Further, when the suggestion is rejected, the registrant 220 registers the mail magazine as accepted in the database 230.

The aforementioned CPU 501 or the like may function as such a suggester 280.

Returning to FIG. 3, the deliverer 290 delivers a mail magazine a delivery date and time of which has arrived to a user being a delivery destination (to a user terminal 400). At that time, the deliverer 290 expands a parts tag included in the mail magazine to an element of the latest linked site or referenced site and replaces the tag with the element. In other word, by replacing the parts tag with the element of the latest linked site or referenced site at the time of delivery, the deliverer 290 delivers a mail magazine preventing occurrence of linkrot or the like to the user terminal 400.

The aforementioned NIC 504 may function as such a deliverer 290.

Functional Configuration of Sender Terminal 300

Figure 10:
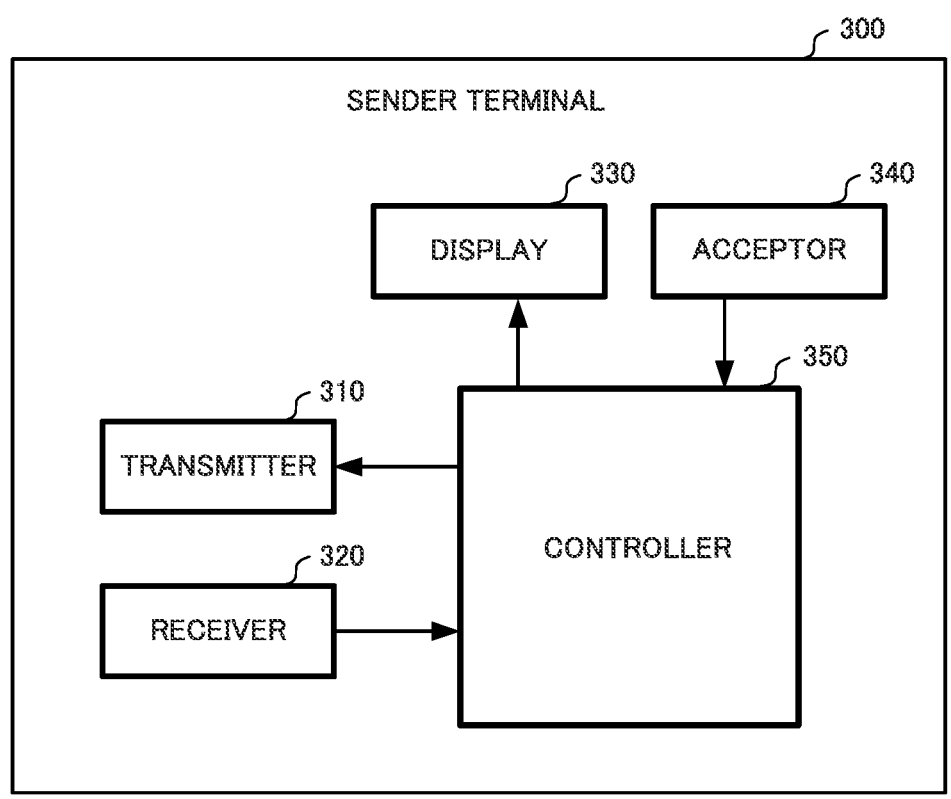
FIG. 10 is a block diagram illustrating an example of a functional configuration of a sender terminal according to the present embodiment.

FIG. 10 is a block diagram illustrating an example of a functional configuration of the sender terminal 300 according to the present embodiment. As illustrated, the sender terminal 300 includes a transmitter 310, a receiver 320, a display 330, an acceptor 340, and a controller 350.

Through the Internet 900, the transmitter 310 transmits information to be transmitted to the message processing device 200 and the like.

For example, the transmitter 310 transmits a mail magazine generated by the controller 350 in accordance with an operation by a sender to the message processing device 200. Specifically, the transmitter 310 transmits a generated mail magazine to the message processing device 200 in order to request delivery to a user terminal 400.

Further, when a suggestion about a mail magazine is made by the message processing device 200, the transmitter 310 also transmits necessity for the suggestion to the message processing device 200.

The aforementioned NIC 504 may function as such a transmitter 310.

Through the Internet 900, the receiver 320 receives various types of information sent from the message processing device 200 and the like.

For example, the receiver 320 receives a suggestion screen SG as illustrated in aforementioned FIG. 9, and the like from the message processing device 200.

The aforementioned NIC 504 may function as such a receiver 320.

The display 330 displays various types of information to be notified to a sender.

For example, the display 330 displays a work screen for generating a mail magazine, and the like. Further, the display 330 also displays a transmission screen for sending a generated mail magazine to the message processing device 200, a suggestion screen SG as illustrated in FIG. 9 received by the receiver 320 at that time, and the like.

The aforementioned display unit 510 may function as such a display 330.

The acceptor 340 accepts an operation by a sender.

For example, the acceptor 340 accepts an operation instruction directed to a work screen for generating a mail magazine. Further, when a suggestion screen SG as illustrated in FIG. 9, or the like is displayed on the display 330, the acceptor 340 accepts an instruction about necessity for the suggestion.

The aforementioned operation unit 509 may function as such an acceptor 340.

The controller 350 controls the entire sender terminal 300.

For example, the controller 350 generates a mail magazine in accordance with an operation by a sender. Further, the controller 350 transmits a generated mail magazine to the message processing device 200 by controlling the transmitter 310.

The aforementioned CPU 501 may function as such a controller 350.

Operation of Message Processing Device 200

Figure 11:
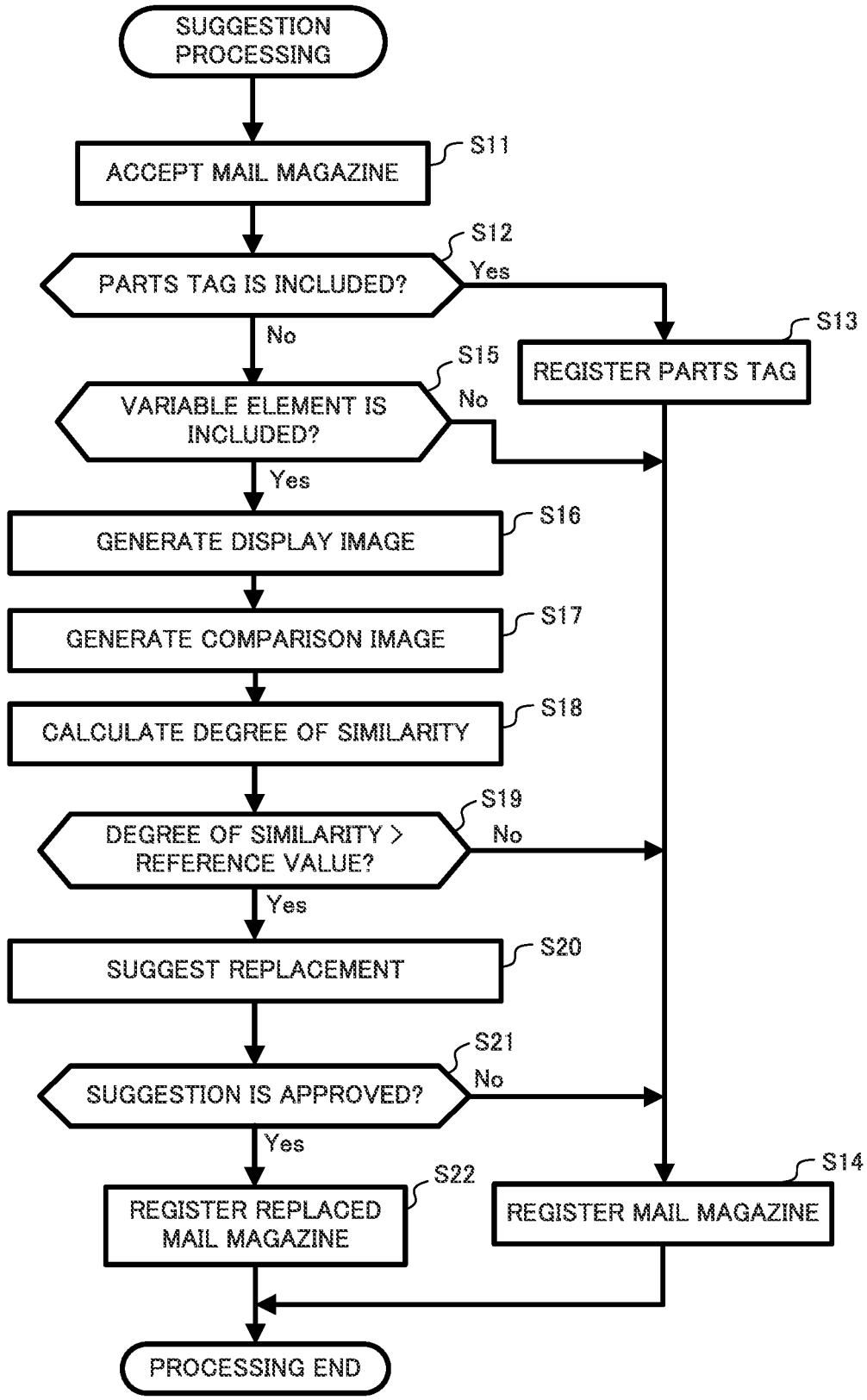
FIG. 11 is a flowchart for illustrating suggestion processing according to the present embodiment.

Operation of the message processing device 200 in the delivery system 100 with such a configuration will be described below with reference to FIG. 11. FIG. 11 is a flowchart illustrating a flow of suggestion processing executed by the message processing device 200. For example, the suggestion processing is executed every time a mail magazine is sent from a sender terminal 300.

First, the message processing device 200 accepts a mail magazine (Step S11).

Specifically, the acceptor 210 accepts a mail magazine (draft message) sent from a sender terminal 300 through the Internet 900.

The message processing device 200 determines whether the mail magazine accepted in aforementioned Step S11 includes a parts tag (Step S12).

Specifically, the registrant 220 determines whether a parts tag (parts element) satisfying a predetermined requirement is included in elements included in the mail magazine described in an HTML format.

When determining that a parts tag is included (Step S12: Yes), the message processing device 200 registers the parts tag (Step S13).

For example, the registrant 220 registers, in the database 230, a parts tag PT included in a mail magazine MM1 as illustrated in FIG. 4. The registrant 220 may register the parts tag PT in the database 230 after checking, for example, whether the parts tag PT can be expanded to a standard tag.

The message processing device 200 registers the mail magazine (Step S14).

Specifically, the registrant 220 registers the mail magazine accepted in Step S11 in the database 230. At that time, for example, the registrant 220 may register, in the database 230, a user terminal 400 being a delivery destination and a date and time when delivery takes place (delivery date and time) in association with the mail magazine.

On the other hand, when determining that a parts tag is not included in aforementioned Step S12 (Step S12: No), the message processing device 200 determines whether a variable element is included (Step S15).

Specifically, the specifier 240 determines whether a non-parts tag that does not satisfy the requirement (that should be described by a parts tag) is included in the elements included in the mail magazine accepted in Step S11.

When determining that a variable element is not included (Step S15: No), the message processing device 200 advances the processing to aforementioned Step S14.

On the other hand, when determining that a variable element is included (Step S15: Yes), the message processing device 200 generates a display image (Step S16).

Specifically, the display image generator 250 generates a display image by applying a drawing engine to a non-parts tag being the variable element included in the mail magazine.

For example, the display image generator 250 generates a display image DI as illustrated in FIG. 7, based on a description of a non-parts tag NPT as illustrated in FIG. 6.

The message processing device 200 generates a comparison image (Step S17).

Specifically, the comparison image generator 260 generates a comparison image by applying the drawing engine to an element acquired by expanding a parts tag registered in aforementioned Step S13. At that time, the comparison image generator 260 generates a comparison image based on each parts tag registered in the database 230 in the most recent predetermined period.

For example, referring to the parts tag information 231 as illustrated in FIG. 5, the comparison image generator 260 generates the comparison images RI1 to RI4 as illustrated in FIG. 8A to FIG. 8D, based on descriptions of variable elements 231b related to recently registered parts tags 231a.

The message processing device 200 calculates a degree of similarity (Step S18).

Specifically, the calculator 270 calculates a degree of similarity between the display image generated in Step S16 and the comparison image generated in Step S17.

For example, the calculator 270 calculates a degree of similarity between the display image DI illustrated in FIG. 7 and each of the comparison images RI1 to RI4 illustrated in FIG. 8A to FIG. 8D by using a learner undergoing machine learning. Without being limited to such a technique using a learner, the technique for calculating a degree of similarity may calculate a degree of similarity by using another technique such as extracting a feature point and performing pattern matching.

The message processing device 200 determines whether the degree of similarity exceeds a reference value (Step S19).

In other words, the message processing device 200 determines whether the degree of similarity between the display image and the comparison image is sufficiently high.

When determining that the degree of similarity does not exceed the reference value (Step S19: No), the message processing device 200 advances the processing to aforementioned Step S14.

On the other hand, when determining that the degree of similarity exceeds the reference value (Step S19: Yes), the message processing device 200 suggests replacement (Step S20).

Specifically, the suggester 280 transmits information prompting replacement of the non-parts tag with a parts tag to the sender terminal 300.

For example, the suggester 280 transmits a suggestion screen SG as illustrated in FIG. 9 to the sender terminal 300, causes the screen to be presented in such a way as to be superimposed on a variable element (non-parts tag) in the mail magazine MM2, and suggests replacement of the non-parts tag with a parts tag.

The message processing device 200 determines whether the suggestion is approved (Step S21).

For example, when the suggestion screen SG as illustrated in FIG. 9 is presented on the sender terminal 300, the acceptor 210 determines whether an operation of approving the suggestion or an operation of rejecting the suggestion is accepted from the sender terminal 300.

When determining that the suggestion is not approved (Step S21: No), the message processing device 200 advances the process to aforementioned Step S14.

On the other hand, when determining that the suggestion is approved (Step S21: Yes), the message processing device 200 registers a replaced mail magazine (Step S22).

Specifically, the registrant 220 registers, in the database 230, a mail magazine in which the non-parts tag is replaced with the parts tag. At that time, for example, the registrant 220 may register, in the database 230, a user terminal 400 being a delivery destination and a date and time at which delivery takes place (a delivery date and time) in association with the mail magazine.

Through such suggestion processing, every time a mail magazine is accepted from a sender (sender terminal 300) practicing use of parts tags, parts tags with usage track records are successively registered. On the other hand, when a mail magazine is accepted from a sender not practicing use of parts tags, a variable element is specified as a non-parts tag. Then, when a degree of similarity between a display image based on the non-parts tag and a comparison image based on a registered parts tag is high, replacement of the non-parts tag with the parts tag (the parts tag being the source of the comparison image) can be suggested.

Further, since comparison with recently used parts tags instead of comparison with every previously prepared parts tag is sufficient, a processing load can be held down and high-speed processing can be performed.

Consequently, use of a recommended parts tag (parts element) can be properly suggested to a sender of a mail magazine.

Other Embodiments

While a case of the comparison image generator 260 generating a comparison image based on a parts tag being registered in the database 230 and having a usage track record has been described in the aforementioned embodiment, a comparison image may also be generated based on a parts tag without a usage track record.

For example, the comparison image generator 260 may generate a comparison image based on every prepared parts tag. Further, in this case, for example, instead of generating a comparison image every time, the comparison image generator 260 may generate a comparison image at a timing when the month changes and register the image in the database 230. In other words, the calculator 270 calculates a degree of similarity between a display image generated by the display image generator 250 and each comparison image registered in the database 230.

Further, while the delivery system 100 delivering a mail magazine has been described as an example in the aforementioned embodiment, without being limited to a mail magazine, for example, the embodiment is similarly applicable to a case of delivering various types of messages such as delivering information by using an SMS.

For example, the acceptor 210 accepts a message sent from a sender terminal 300. In other words, the acceptor 210 accepts a draft message generated by each of a plurality of senders.

Further, the registrant 220 registers, in the database 230, a parts element included in a message accepted by the acceptor 210.

Further, the specifier 240 specifies a non-parts element included in a message generated by a sender not practicing use of parts elements (a first sender).

Further, the display image generator 250 generates a display image, based on the non-parts element.

Further, the comparison image generator 260 generates a comparison image, based on an element acquired by expanding a parts element registered in the database 230.

Further, the calculator 270 calculates a degree of similarity between the display image generated based on the non-parts element and the comparison image generated based on the element acquired by expanding the registered parts element.

Then, when the calculated degree of similarity exceeds the reference value, the suggester 280 transmits, to the first sender, information prompting replacement of the non-parts element with the parts element related to the comparison image.

Further, the deliverer 290 delivers a message a delivery date and time of which has arrived to a user terminal 400 by using an SMS. At that time, the deliverer 290 expands the parts element included in the message to an element of the latest linked site or referenced site and replaces the parts element with the element. In other words, by replacing the parts element with the element of the latest linked site or referenced site at the time of delivery, the deliverer 290 delivers a message preventing occurrence of linkrot or the like to the user terminal 400.

In this case, use of a recommended parts element can also be properly suggested to a sender of a message.

As described above, the present disclosure can provide a message processing device, a suggestion method, and a non-transitory recording medium that can properly suggest use of a recommended parts element to a sender of a message.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A message processing device processing a message to be sent from a sender to a user, the message processing device comprising:
   an acceptor accepting a draft message generated by each of a plurality of senders;
   a registrant registering, in a database, a parts element satisfying a predetermined requirement from among one or more elements included in the draft message accepted by the acceptor;
   a specifier specifying a non-parts element not satisfying the requirement from among one or more elements included in the draft message being generated by a first sender and being accepted by the acceptor;
   a display image generator generating a display image by applying a predetermined drawing engine to the non-parts element specified by the specifier;
   a comparison image generator generating a comparison image by applying the drawing engine to an element acquired by expanding the parts element registered in the database;
   a calculator calculating a degree of similarity between the generated display image and the generated comparison image; and
   a suggester transmitting, to the first sender, information prompting replacement of the non-parts element with the parts element related to the comparison image when the degree of similarity calculated by the calculator exceeds a reference value.

2. The message processing device according to claim 1, wherein the specifier specifies the non-parts element being a variable element in which a linked site or a referenced site changes over time.

3. The message processing device according to claim 1, wherein the comparison image generator generates the comparison image, based on the each parts element registered in the database in a most recent predetermined period.

4. The message processing device according to claim 1, wherein the registrant registers, in the database, the draft message accepted by the acceptor or the draft message in which the non-parts element is replaced with the parts element in accordance with a suggestion by the suggester.

5. The message processing device according to claim 4, further comprising
   a deliverer delivering, to the user, a message in which the parts element included in the draft message registered in the database is replaced with an element acquired by expanding the parts element when a delivery date and time associated with the draft message arrives.

6. A suggestion method executed by a message processing device processing a message to be sent from a sender to a user, the suggestion method comprising:
- accepting a draft message generated by each of a plurality of senders;
- registering, in a database, a parts element satisfying a predetermined requirement from among one or more elements included in the accepted draft message;
- specifying a non-parts element not satisfying the requirement from among one or more elements included in the accepted draft message being generated by a first sender;
- generating a display image by applying a predetermined drawing engine to the specified non-parts element;
- generating a comparison image by applying the drawing engine to an element acquired by expanding the parts element registered in the database;
- calculating a degree of similarity between the generated display image and the generated comparison image; and
- transmitting, to the first sender, information prompting replacement of the non-parts element with the parts element related to the comparison image when the calculated degree of similarity exceeds a reference value.

7. A non-transitory computer-readable recording medium recording a program causing a computer to process a message to be sent from a sender to a user to function as:
- an acceptor accepting a draft message generated by each of a plurality of senders;
- a registrant registering, in a database, a parts element satisfying a predetermined requirement from among one or more elements included in the draft message accepted by the acceptor;
- a specifier specifying a non-parts element not satisfying the requirement from among one or more elements included in the draft message being generated by a first sender and being accepted by the acceptor;
- a display image generator generating a display image by applying a predetermined drawing engine to the non-parts element specified by the specifier;
- a comparison image generator generating a comparison image by applying the drawing engine to an element acquired by expanding the parts element registered in the database;
- a calculator calculating a degree of similarity between the generated display image and the generated comparison image; and
- a suggester transmitting, to the first sender, information prompting replacement of the non-parts element with the parts element related to the comparison image when the degree of similarity calculated by the calculator exceeds a reference value.

* * * * *